United States Patent
Dong et al.

(10) Patent No.: US 9,128,786 B2
(45) Date of Patent: Sep. 8, 2015

(54) SYSTEM AND METHOD FOR IMPLEMENTING SHARED LOCKS BETWEEN KERNEL AND USER SPACE FOR SYNCHRONIZE ACCESS WITHOUT USING A SYSTEM CALL TO THE KERNEL

(75) Inventors: Xuesong Dong, Pleasonton, CA (US); Hongtao Yin, Fremont, CA (US); Randall Stewart, Chapin, SC (US); Shihui Hu, Beijing (CN); Fengkai Li, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 241 days.

(21) Appl. No.: 13/302,918

(22) Filed: Nov. 22, 2011
(Under 37 CFR 1.47)

(65) Prior Publication Data
US 2013/0132627 A1    May 23, 2013

(51) Int. Cl.
*G06F 12/00* (2006.01)
*G06F 9/54* (2006.01)
*G06F 9/52* (2006.01)
*G06F 9/48* (2006.01)

(52) U.S. Cl.
CPC .............. *G06F 9/545* (2013.01); *G06F 9/526* (2013.01); *G06F 9/4881* (2013.01); *G06F 9/52* (2013.01)

(58) Field of Classification Search
CPC ....... G06F 9/52; G06F 9/526; G06F 9/48881; G06F 9/545
USPC .......... 718/102, 107; 711/147, 152, 167, 163; 710/200
See application file for complete search history.

(56) References Cited

U.S. PATENT DOCUMENTS

| | | | |
|---|---|---|---|
| 6,389,420 B1 | 5/2002 | Vahalia et al. | |
| 7,161,926 B2 | 1/2007 | Elson et al. | |
| 7,555,614 B1 | 6/2009 | Haynes et al. | |
| 7,725,643 B1 * | 5/2010 | Boucher | 711/102 |
| 7,773,090 B1 * | 8/2010 | Diard et al. | 345/522 |
| 8,495,750 B2 * | 7/2013 | Rosu | 726/27 |

(Continued)

FOREIGN PATENT DOCUMENTS

| | | |
|---|---|---|
| CN | 1818874 A | 8/2006 |
| CN | 101566977 A | 10/2009 |

(Continued)

OTHER PUBLICATIONS

Foreign Communication From A Counterpart Application, PCT Application PCT/CN2012/085015, International Search Report dated Feb. 28, 2013, 6 pages.

(Continued)

*Primary Examiner* — Meng An
*Assistant Examiner* — Abu Ghaffari
(74) *Attorney, Agent, or Firm* — Conley Rose, P.C.; Grant Rodolph; Brandt D. Howell

(57) ABSTRACT

An apparatus comprising one or more processors configured to implement a plurality of operations for an operating system (OS) platform including a kernel and a user application, one or more shared resource blocks by the kernel and the user application, and one or more shared locks by the kernel and the user application corresponding to the shared resource blocks, wherein the user application is configured to synchronize accesses to the shared resource blocks between a user thread and a kernel thread by directly accessing the locks without using a system call to the kernel.

7 Claims, 5 Drawing Sheets

(56) References Cited

U.S. PATENT DOCUMENTS

| | | | |
|---|---|---|---|
| 8,745,442 B1* | 6/2014 | Havemose | 714/15 |
| 2002/0138664 A1* | 9/2002 | Blott et al. | 709/328 |
| 2003/0014521 A1 | 1/2003 | Elson et al. | |
| 2003/0182347 A1* | 9/2003 | Dehlinger | 709/1 |
| 2004/0054861 A1* | 3/2004 | Harres | 711/163 |
| 2005/0114609 A1 | 5/2005 | Shorb | |
| 2006/0143361 A1 | 6/2006 | Kottapalli et al. | |
| 2006/0259907 A1 | 11/2006 | Bhatia et al. | |
| 2008/0005741 A1* | 1/2008 | Terrell | 718/102 |
| 2008/0263554 A1* | 10/2008 | Rosu et al. | 718/102 |
| 2009/0073981 A1 | 3/2009 | Coyte et al. | |
| 2009/0328041 A1 | 12/2009 | Sudzilouski | |
| 2010/0306432 A1* | 12/2010 | Juarez et al. | 710/200 |
| 2010/0312972 A1 | 12/2010 | Gao | |
| 2011/0265093 A1* | 10/2011 | Nakahara et al. | 718/104 |
| 2012/0204060 A1* | 8/2012 | Swift et al. | 714/15 |

FOREIGN PATENT DOCUMENTS

| | | |
|---|---|---|
| EP | 0783152 A2 | 7/1997 |
| GB | 2429089 A | 2/2007 |

OTHER PUBLICATIONS

Foreign Communication From A Counterpart Application, PCT Application PCT/CN2012/085015, Written Opinion dated Feb. 28, 2013, 4 pages.

Foreign Communication From A Counterpart Application, Application No. 12851228.2, Extended European Search Report dated Oct. 23, 2014, 7 pages.

* cited by examiner

SYSTEM AND METHOD FOR IMPLEMENTING SHARED LOCKS BETWEEN KERNEL AND USER SPACE FOR SYNCHRONIZE ACCESS WITHOUT USING A SYSTEM CALL TO THE KERNEL

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some current Operating System (OS) platforms, such as used in computation devices and network components, allow sharing computing/networking resources (e.g., memory, processor usage, bandwidth, etc.) between a kernel space and a user space. The kernel corresponds to a component of the OS that bridges between applications (software) and the actual data processing implemented at the hardware level. The kernel's responsibilities include managing the system's resources, such as communications between hardware and software components. Typically, the kernel provides the lowest-level abstraction layer for the resources (e.g., for processors and input/output (I/O) devices), which the application software needs to control to perform its function. The kernel typically makes these resources available to application processes through inter-process communication mechanisms and system calls. The kernel space comprises the tasks, operations, and associated resources used by the kernel. The user space comprises the tasks, operations, and associated resources used by the application or software.

SUMMARY

In one embodiment, the disclosure includes an apparatus comprising one or more processors configured to implement a plurality of operations for an operating system (OS) platform including a kernel and a user application, one or more shared resource blocks by the kernel and the user application, and one or more shared locks by the kernel and the user application corresponding to the shared resource blocks, wherein the user application is configured to synchronize accesses to the shared resource blocks between a user thread and a kernel thread by directly accessing the locks without using a system call to the kernel.

In another embodiment, the disclosure includes a shared memory block, and a network component comprising a processor for an OS platform configured to receive a request from a first OS thread that operates on the processor to access the shared memory block for a plurality of OS threads, and to allow the first OS thread to lock and access the shared memory block if the shared memory block is not locked by a second OS thread or if a time limit for a lock by the second OS thread is expired.

In a third aspect, the disclosure includes a method implemented by a processor that implements an OS platform including a plurality of threads including application threads and kernel threads, comprising setting a lock for a target memory block by a first thread the lock is not set by another thread, receiving from an OS kernel by the first thread information about allowed operations and time limit for the lock, accessing by the first thread a map of the target memory block, and releasing by the first thread the lock on the target memory block if a terminate call is received by the first thread from a higher priority thread or if operations on the target memory block by the first thread are completed.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In typical OS platforms, resources are shared between the user space and the kernel space using locks. The locks are implemented in the kernel space to guard or reserve resources for the kernel and prevent the user space from accessing the locked resources. If a resource is not locked (e.g., by the kernel), then the user space can access that resource. To lock resources, the user thread sends lock operation requests using system calls. This lock scheme could result in bottlenecks, e.g., for relatively large quantities of lock operation requests and system calls, which can be detrimental to high performance systems.

Real time system such as router OS platforms may require relatively high performance infrastructure support and relatively high system overhead. When performance is critical, e.g., in a zero-copy socket, the system buffers may not be copied from and to the kernel. Instead, the buffers may be shared between the user space and the kernel space. In this case, improving the lock mechanism for the shared resource (e.g., buffer or memory) may substantially improve system performance. Disclosed herein is a system and method for managing and handling kernel-user shared locks to improve memory or resource sharing and protection between the user space and the kernel space. The kernel-user shared locks may be managed and operated to reduce communications cost between the user space and the kernel space and boost system performance. Unlike typical schemes that are based on using system calls provided by the kernel, the disclosed system and method may allow user applications (user space) to directly set the kernel-user shared locks to access blocks of memory (or similar resources) that are shared between the user space and the kernel space. The kernel-user shared locks may allow user applications to directly lock and unlock the shared locks without system calls to synchronize the accesses to blocks of shared memory between the user space and kernel space. The details of implementing the kernel-user shared locks are described in detail below.

Figure 1:
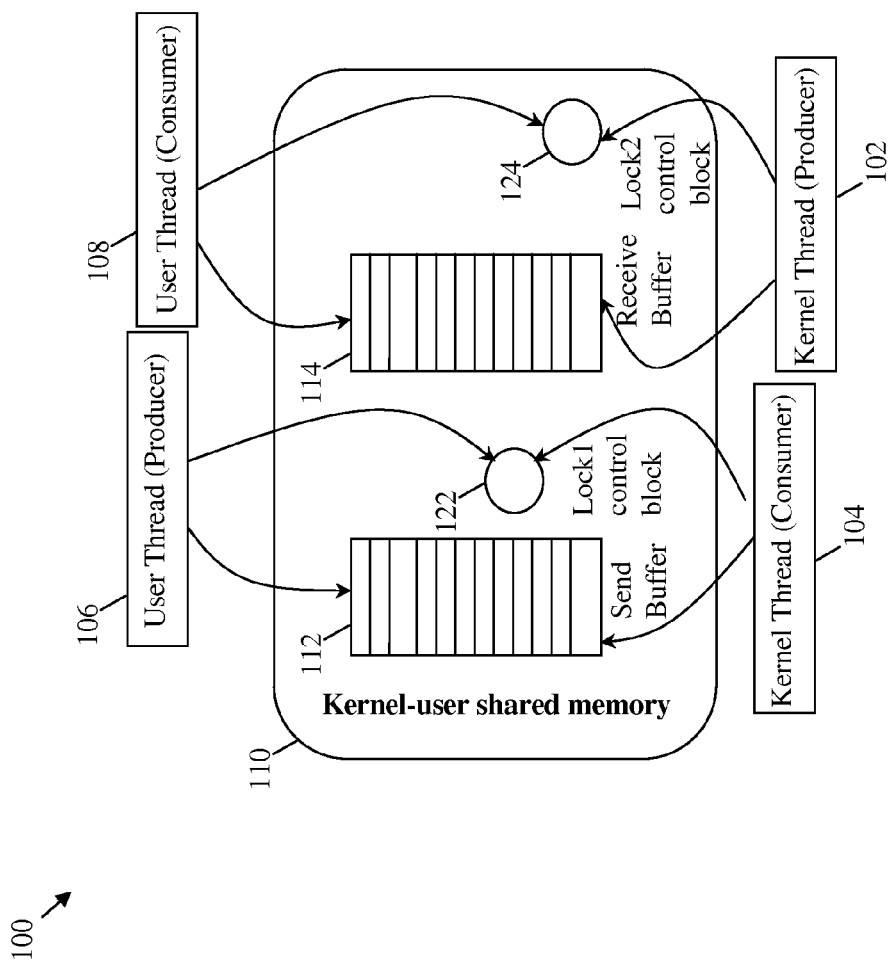
FIG. 1 is a schematic diagram of an embodiment of a kernel-user shared locks system.

FIG. 1 illustrates an embodiment of kernel-user shared locks system 100, which may be used in a routing platform, such as a multi-process routing OS or software platform. For example, the routing platform may correspond to one or more network routing components, such as routers, where user space applications (e.g., routing applications) may communicate with the system's kernel to obtain information or data from the kernel and/or a network interface. The kernel-user shared locks system 100 may implement a kernel-user shared locks scheme, which may allow sharing some resources and/or data structures between the kernel space and the user space with substantially limited use of system calls. Limiting the use of system calls may improve the communications performance within and across the platform's components or machines, and hence reduce system overhead. A set of kernel-user shared locks may be used, which may comprise a plurality of mutually exclusive locks, read/write locks, spin locks, and/or other types of locks.

The kernel-user shared locks system 100 may comprise a kernel-user shared memory or memory block 110, which may be accessed by a kernel producer thread 102, a kernel consumer thread 104, a user producer thread 106, and a user consumer thread 108. The kernel-user shared memory 110 may comprise a send buffer 112, a receive block 114, a first lock (Lock1) control block 122 associated with the send buffer 112, and a second lock (Lock2) control block 124 associated with the receive buffer 114. The kernel producer thread 102 may be part of the kernel space that is configured to access the receive buffer 114 to place data. The user consumer thread 108 may be part of the user space (or application) that is configured to access the receive buffer 114 to receive the placed data. The user producer thread 106 may be part of the user space that is configured to access the send buffer 112 to place data. The kernel consumer thread 104 may be part of the kernel space that is configured to access the send buffer 112 to obtain the placed data.

The kernel producer thread 102 and the user consumer thread 108 may check the Lock2 control block 124 before attempting to access the receive buffer 114. If the Lock2 control block 124 is not locked or a lock time for the Lock2 control block 124 is expired, then the kernel producer thread 102 or the user consumer thread 108 may lock the Lock2 control block 124 and then access the receive buffer 114. Similarly, the user producer thread 106 and the kernel consumer thread 104 may check the Lock1 control block 122 before attempting to access the send buffer 112. If the Lock1 control block 122 is not locked or a lock time for the Lock1 control block 122 is expired, then the user producer thread 106 or the kernel consumer thread 104 may lock the Lock1 control block 122 and then access the send buffer 112. For instance, the Lock1 control block 122 and the Lock2 control block 124 may be memory components that comprise data structures, such as flags, that may be set to place a lock or unset to remove the lock.

The kernel-user shared lock system 100 may be advantageous in protecting data structures that behave in a producer-consumer fashion. The content of a kernel socket buffer may be typically copied from or to user memory space. If the buffers are shared between user space and kernel space, the shared locks may be used to protect the shared data structures. A user thread or process may correspond to the user producer thread 106 on the send buffer 112 or the user consumer thread 108 on the receive buffer 114. A kernel thread may correspond to the kernel producer thread 102 on the receive buffer 114 or the kernel consumer thread 104 on the send buffer 112. A user thread may hold the shared lock for a maximum period of time, which may be determined at the lock creation and may run to completion until the lock is released. The user thread's priority may vary according to priority inheritance (hierarchy) settings.

A user space application programming interface (API) (or code) may be used (e.g., by the user producer thread 106 or the user consumer thread 108) to initialize a lock (e.g., for the Lock1 control block 122 or the Lock2 control block 124). During the initialization, a portion of the kernel-user shared memory 110 (e.g., the send buffer 112 or the receive buffer 114) may be created and mapped into user memory space. When the lock is initialized, the user application (e.g., the user producer thread 106 or the user consumer thread 108) may get a contract from the kernel specifying the operations that the application can perform on the lock and/or how long the application can hold the lock. If the lock is held longer than the specified time limit, the user process may be killed by the kernel (e.g., by the kernel consumer thread 104 or the kernel producer thread 102).

When the user applications or the kernel try to acquire or release the lock, the acquire/release operation may be done directly without invoking a system call, unlike typical shared lock schemes. When a user application holds a lock, the user application may run to completion until the lock is released, but the user application may still be subject to preemption if the system allows it. For instance, the kernel may kill the user application and release the lock at any time if needed. The different threads (kernel and user threads) may be categorized so that some categories of threads (e.g., kernel threads) have higher precedence in acquiring the lock than other categories of threads (e.g., user threads). Priority inversion may be addressed by priority inheritance settings, which may allow, for example, the priority of a user thread to be as high as that of a kernel thread. Priority inversion is a problematic scenario in scheduling when a higher priority task is indirectly preempted by a lower priority task effectively "inverting" the relative priorities of the two tasks. This violates the priority model that high priority tasks can only be prevented from running by higher priority tasks and briefly by low priority tasks which will quickly complete their use of a resource shared by the high and low priority tasks.

Figure 2:
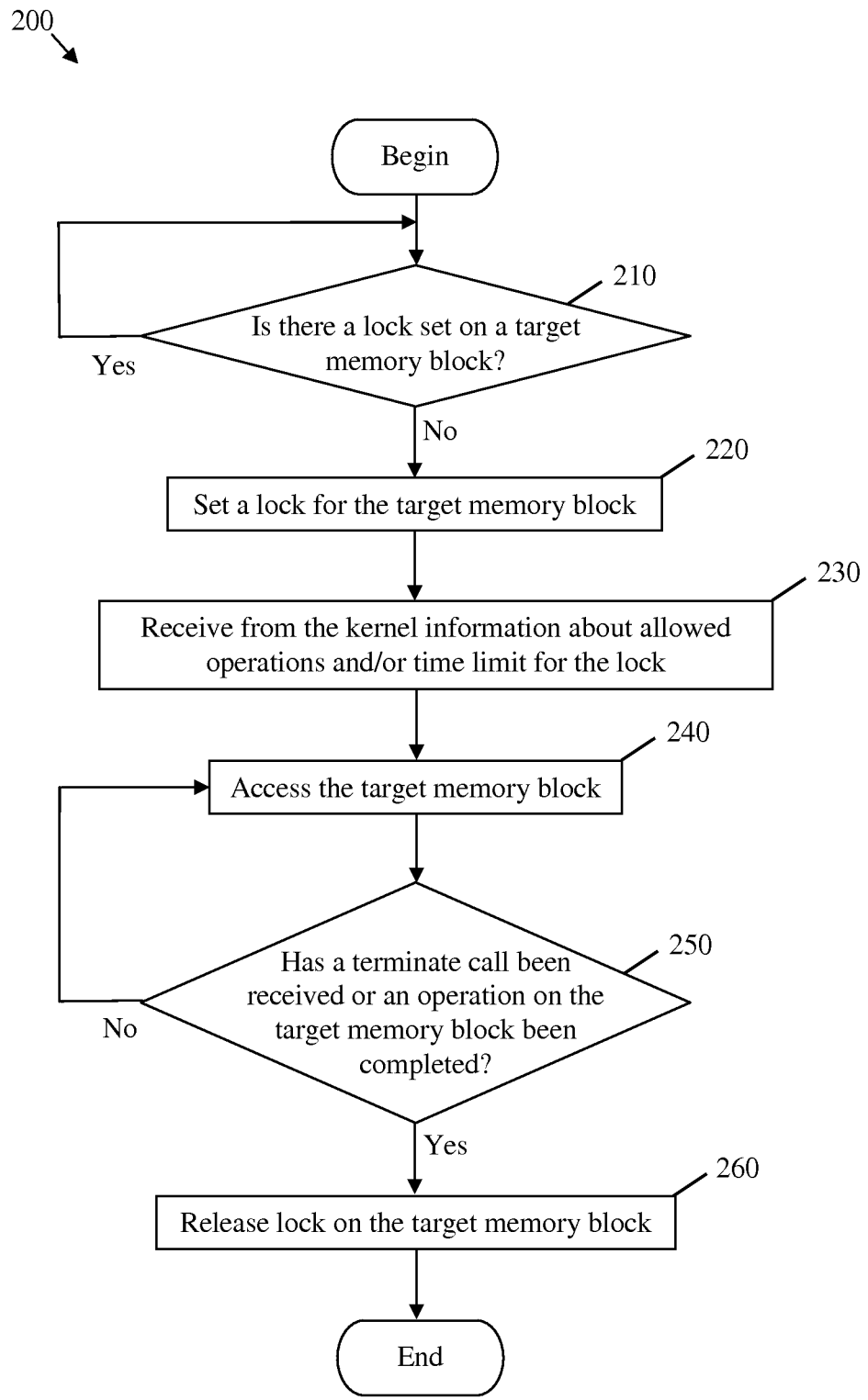
FIG. 2 is a flow chart of an embodiment of a kernel-user shared locks method.

FIG. 2 illustrates an embodiment of a kernel-user shared locks method 200, which may be implemented in the kernel-user shared locks system 100. The kernel-user shared locks method 200 may be implemented by a user thread or user application, such as the user producer thread 106 or the user consumer thread 108. The kernel-user shared locks method 200 may begin at block 210, where the user application or thread may determine whether there is a lock set on a target memory block. For example, the user producer thread 106 may check whether the Lock1 control block 122 is set for the send buffer 112. Similarly, the user consumer thread 108 may check whether Lock2 control block 124 is set for the receive block 114. If the condition in block 210 is true, then the method 200 may return to block 210 (i.e., begin again) to verify after some time if the lock is still set. Otherwise, the method 200 may proceed to block 220.

At block 220, a lock may be set for the target memory block. The user thread may set the lock when the lock is not set, e.g., by another user thread or the kernel, on the target memory block. At block 230, information about allowed operations and/or time limit for the lock may be received from the kernel. The user thread may receive such data from the kernel, and may set a timer accordingly for accessing and operating on the target memory block. At block 240, the target memory block may be accessed. The user thread may map the target memory block to the user space and then access the mapped memory data, e.g., to perform a read operation, write operation, or other types of operations.

At block 250, the user thread may determine whether a terminate call has been received or the operation on the target memory block been completed. If the user thread receives a kill or terminate call from the kernel or from any thread that has higher priority than the user thread, or if the user thread operation is completed, then the method 200 may proceed to block 260. Otherwise, the method 200 may return to block 250 and continue accessing and operating on the target memory block until the condition in block 250 becomes true. At block 260, the lock on the target memory block may be released. Thus, the user thread may not have anymore access to the shared memory block and may terminate or halt operation. The method 200 may then end.

Figure 3:
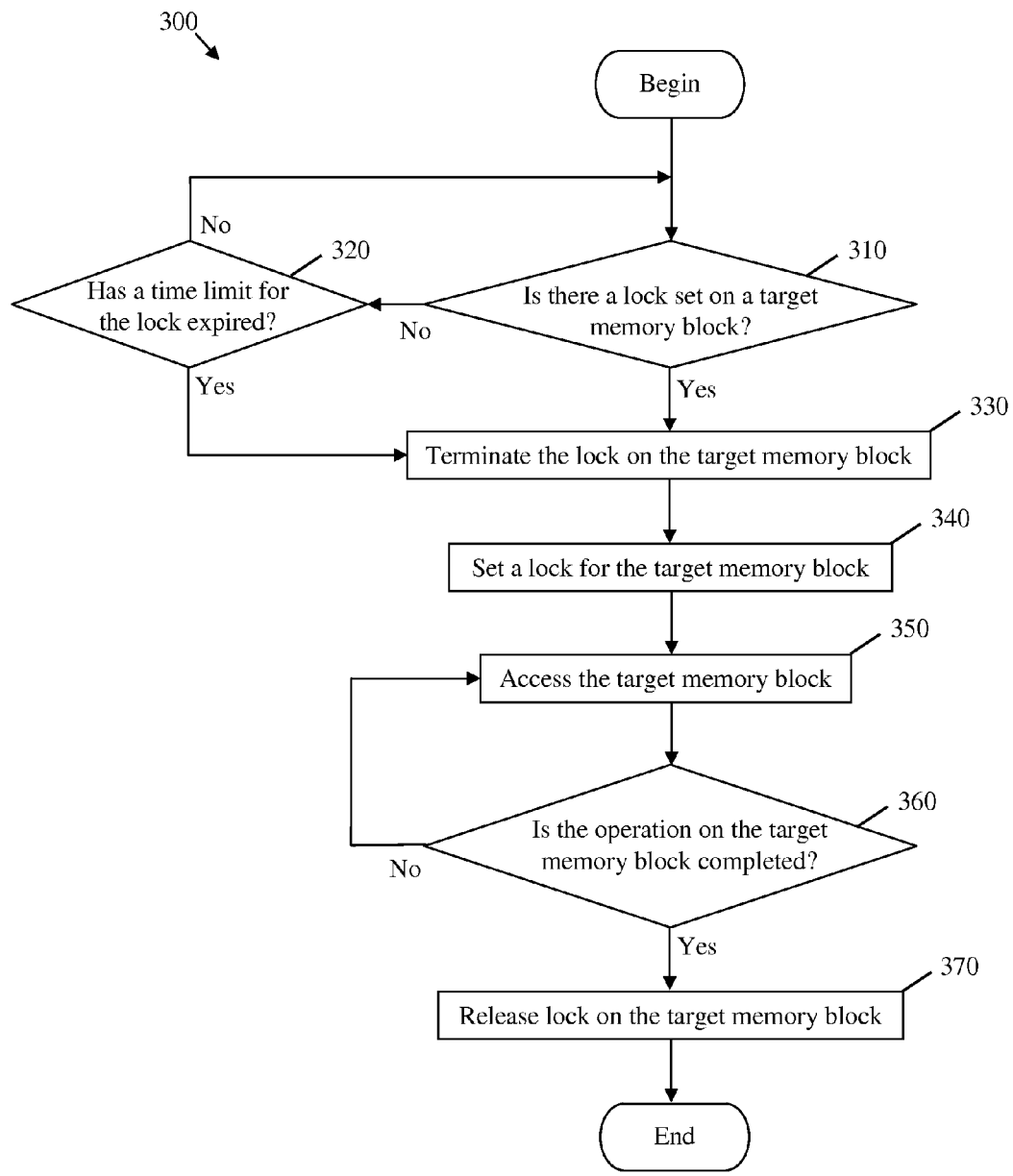
FIG. 3 is a flow chart of another embodiment of a kernel-user shared locks method.

FIG. 3 illustrates an embodiment of another kernel-user shared locks method 300, which may be implemented in the kernel-user shared locks system 100. The kernel-user shared locks method 300 may be implemented by a kernel thread, such as the kernel producer thread 102 or the kernel consumer thread 104. The kernel-user shared locks method 300 may begin at block 310, where the kernel thread may determine whether there is a lock set on a target memory block. For example, the kernel producer thread 102 may check whether the Lock2 control block 124 is set for the receive buffer 114. Similarly, the kernel consumer thread 104 may check whether Lock1 control block 122 is set for the send block 112. If the condition in block 310 is true, then the method 300 may proceed to block 330. Otherwise, the method 300 may proceed to block 320.

At block 320, the kernel thread may determine whether a time limit for the lock has expired. If the condition in block 320 is true, then the method 300 may proceed to block 330. Otherwise, the method 300 may return to block 310 (i.e., begin again) to verify after some time if the lock is still set. At block 330, the lock on the target memory block may be terminated, e.g., by the kernel thread. At block 340, a lock may be set for the target memory block, e.g., by the kernel thread. At block 350, the target memory block may be accessed, e.g., by the kernel thread to perform a write operation, read operation, or other types of operations. At block 360, the kernel thread may determine whether the operation on the target memory block is completed. If the kernel thread operation is completed, then the method 300 may proceed to block 370. Otherwise, the method 300 may return to block 350 and continue accessing and operating on the target memory block until the condition in block 360 becomes true. At block 370, the lock on the target memory block may be released. Thus, the target memory block may become available to other threads. The method 300 may then end.

In some embodiments, a higher priority (user) thread may implement similar steps as in the method 300 to lock/access a target memory block that may be shared with a lower (user) thread. For instance, the higher thread may terminate the lock of the lower thread and then lock and access the target memory block. The higher thread may then release the lock when the thread operation is completed. A lower thread may not have the right to terminate a lock set by a higher thread, but may wait until the lock is terminated by the operating thread. The kernel may have the highest priority to terminate locks and accessing shared memory blocks. Further, different kernel threads and/or user threads may be assigned different priorities. The locking/termination mechanisms in the methods 200 and 300 may be implemented without the need to send or initiate system calls in the kernel.

Figure 4:
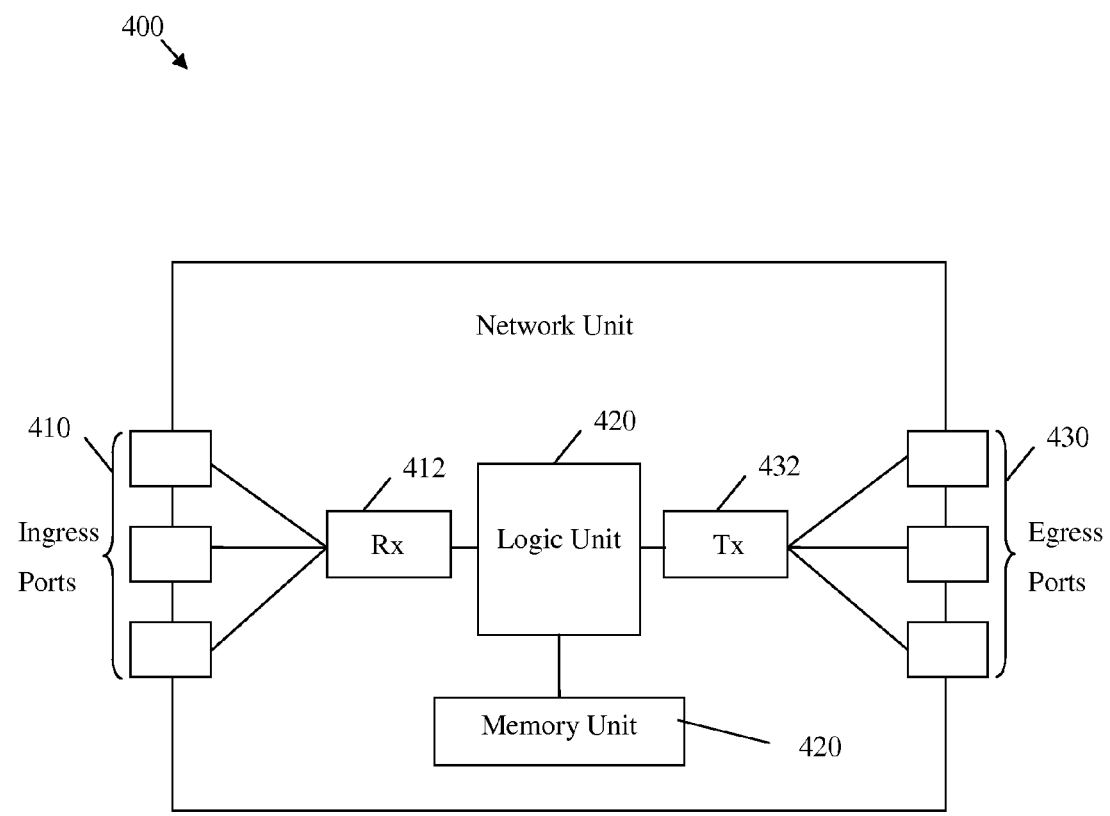
FIG. 4 is a schematic diagram of an embodiment of a network unit.

FIG. 4 illustrates an embodiment of a network unit 400, which may be any device that routes data or packets in a network. For instance, the network unit 400 may be located in a router or any network component that exchanges or communicates data with other components. The network unit 400 may comprise one or more ingress ports 410 coupled to a receiver 412 (Rx), which may be configured for receiving data, packets, or frames from other components. The network unit 400 may comprise a logic unit or processor 420 coupled to the receiver 412 and configured to process the data or otherwise determine to which components to send the data. The logic unit 420 may also be coupled to a memory unit 440 for data storage. The logic unit or processor 420 may also be configured to implement or support the kernel-user shared methods 200 and 300. The logic unit or processor 420 may be implemented using hardware, software, or both. The network unit 400 may also comprise one or more egress ports 430 coupled to a transmitter 432 (Tx), which may be configured for transmitting data, packets, or frames to other components.

Figure 5:
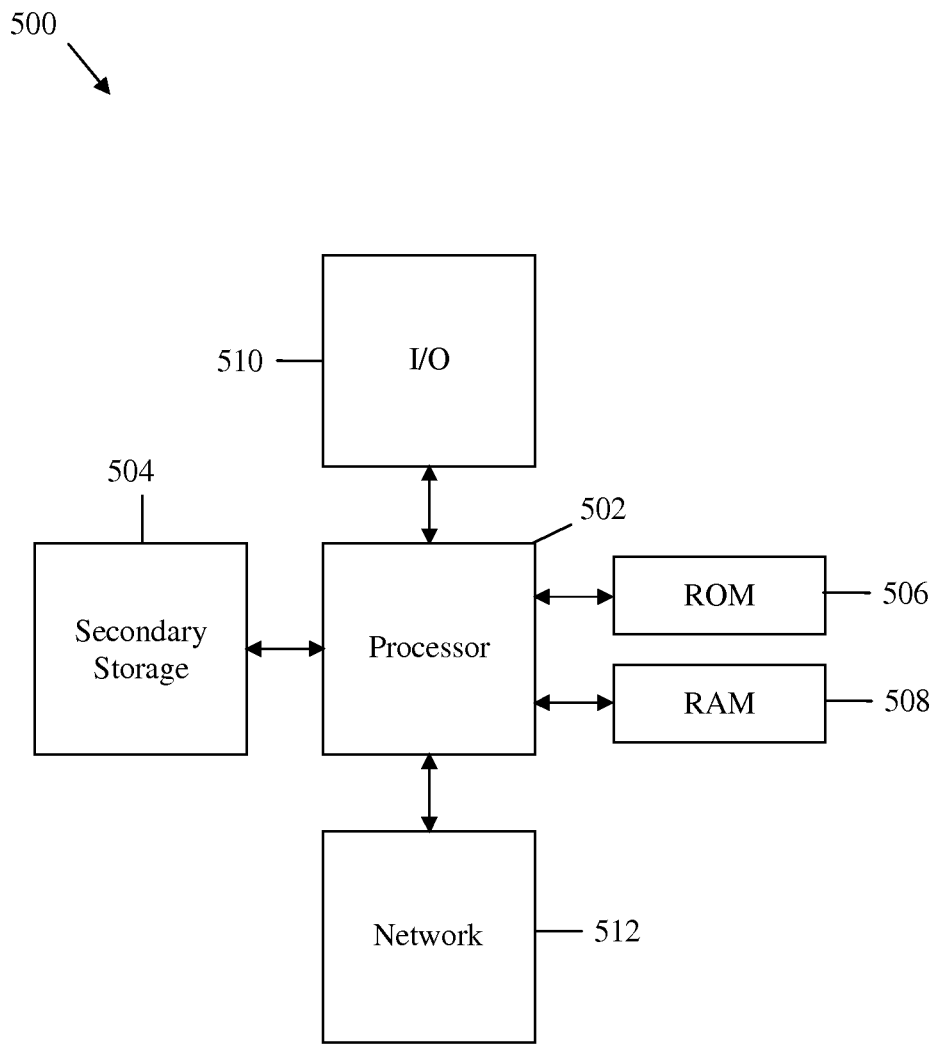
FIG. 5 is a schematic diagram of an embodiment of a general-purpose computer system.

The components and/or methods described above may be implemented on any general-purpose network component, such as a computer or network component with sufficient processing power, memory resources, and network throughput capability to handle the necessary workload placed upon it. FIG. 5 illustrates a typical, general-purpose network component 500 suitable for implementing one or more embodiments of the components disclosed herein. The network component 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips, or may be part of one or more application specific integrated circuits (ASICs).

The secondary storage 504 is typically comprised of one or more disk drives or tape drives and is used for non-volatile storage of data and as an over-flow data storage device if RAM 508 is not large enough to hold all working data. Secondary storage 504 may be used to store programs that are loaded into RAM 508 when such programs are selected for execution. The ROM 506 is used to store instructions and perhaps data that are read during program execution. ROM 506 is a non-volatile memory device that typically has a small memory capacity relative to the larger memory capacity of secondary storage 504. The RAM 508 is used to store volatile data and perhaps to store instructions. Access to both ROM 506 and RAM 508 is typically faster than to secondary storage 504.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
    one or more processors configured to implement a plurality of operations for an operating system (OS) platform including a kernel and a user application;
    one or more shared physical memory blocks that are accessible to both a thread of the kernel and a user thread of the user application; and
    one or more shared locks that are manageable by both the kernel thread and the user thread,
    wherein each of the shared locks corresponds to at least one of the shared physical memory blocks,
    wherein the user application is configured to synchronize accesses to the shared physical memory blocks between the user thread and the kernel thread by accessing the locks via the user thread without using a system call to the kernel,
    wherein the kernel thread is configured to set at least one of the shared locks prior to accessing the corresponding shared physical memory block to lock out access by the user thread,
    wherein the user thread is configured to set at least one of the shared locks prior to accessing the corresponding shared physical memory block to lock out access by the kernel thread,
    wherein the user application shares the shared physical memory blocks by mapping physical memory block data from a kernel space into a user space and operating on the mapped data,
    wherein the operations for the OS include a plurality of kernel threads and a plurality of user threads that are categorized according to priority,
    wherein the kernel threads that have higher priority are allowed to remove the locks set by the user threads that have lower priority by terminating the user threads, and
    wherein the shared locks are initialized in a kernel space and used by the user threads and the kernel threads.

2. The apparatus of claim 1, wherein the OS platform is a multi-processing network routing OS platform, and wherein the user application is a network routing function.

3. The apparatus of claim 1, wherein the shared locks comprise at least one of a plurality of mutually exclusive locks, read/write locks, and spin locks.

4. The apparatus of claim 1, wherein the shared physical memory blocks comprise a zero-copy socket that is shared between the kernel and the user application.

5. The apparatus of claim 1, wherein the one or more shared physical memory blocks comprise a send buffer and a receive buffer, wherein the one or more shared locks comprise a send buffer lock and a receive buffer lock, wherein the user thread is a producer user thread that is configured to access the send buffer and manage the send buffer lock, wherein the producer user thread is not configured to access the receive buffer, and wherein the producer user thread is not configured to manage the receive buffer lock.

6. The apparatus of claim 5, wherein the kernel thread is a consumer kernel thread that is configured to access the send buffer and manage the send buffer lock, wherein the consumer kernel thread is not configured to access the receive buffer, and wherein the consumer kernel thread is not configured to manage the receive buffer lock.

7. An apparatus comprising:
    one or more processors configured to implement a plurality of operations for an operating system (OS) platform including a kernel and a user application;
    one or more shared physical memory blocks that are accessible to both a thread of the kernel and a user thread of the user application; and
    one or more shared locks that are directly manageable by both the kernel thread and the user thread,
    wherein each of the shared locks corresponds to at least one of the shared physical memory blocks,
    wherein the user application is configured to synchronize accesses to the shared physical memory blocks between the user thread and the kernel thread by directly accessing the locks via the user thread without using a system call to the kernel, wherein the kernel thread is configured to set at least one of the shared locks prior to accessing the corresponding shared physical memory block to lock out access by the user thread, wherein the user thread is configured to set at least one of the shared locks prior to accessing the corresponding shared physical memory block to lock out access by the kernel thread, wherein the one or more shared physical memory blocks comprise a send buffer and a receive buffer, wherein the one or more shared locks comprise a send buffer lock and a receive buffer lock, wherein the user thread is a consumer user thread, wherein the kernel thread is a producer kernel thread, wherein the user application is associated with the consumer user thread, wherein the kernel is associated with the producer kernel thread, wherein the receive buffer is shared by the consumer user thread and the producer kernel thread, wherein the consumer user thread is configured to access the receive buffer and manage the receive buffer lock, wherein the consumer user thread is not configured to access the send buffer, wherein the consumer user thread is not configured to manage the send buffer lock, wherein the producer kernel thread is configured to access the receive buffer and manage the receive buffer lock, wherein the producer kernel thread is not configured to access the send buffer, and wherein the producer kernel thread is not configured to manage the send buffer lock.

* * * * *